July 1, 1952 W. K. HODDER ET AL 2,602,139

BRIDGE OSCILLATOR

Filed Aug. 10, 1948 2 SHEETS--SHEET 1

WAYNE K. HODDER
GEORGE R. GAMERTSFELDER
ARVID W. JACOBSON, JR.
INVENTOR

BY H. A. Mackey
ATTORNEY

WAYNE K. HODDER
GEORGE R. GAMERTSFELDER
ARVID W. JACOBSON, JR.
Inventor

By H. L. Mackey

Attorney

Patented July 1, 1952 2,602,139

UNITED STATES PATENT OFFICE 2,602,139

BRIDGE OSCILLATOR

Wayne K. Hodder, George R. Gamertsfelder, and Arvid W. Jacobson, Jr., Pleasantville, N. Y., assignors to General Precision Laboratory Incorporated, a corporation of New York Application August 10, 1948, Serial No. 43,434

9 Claims. (Cl. 250—36)

This invention relates to an oscillator of the bridge type and particularly to an oscillator wherein the frequency may be made to vary linearly with the variation in shaft position over a relatively wide range.

In general oscillators heretofore devised have been such that the frequency generated thereby is proportional to the reciprocal of a resistance, capacitance or inductance. Such an arrangement provides an oscillator whose frequency varies in a non-linear fashion with the shaft position which actuates the controlling element or elements and which is, therefore, more difficult to calibrate.

The instant invention has for its purpose the provision of an oscillator circuit such that its frequency is directly proportional to the angular position of an actuating shaft.

To this end the present invention utilizes an oscillator of the bridge type wherein the bridge network is composed of resistances and inductances. The linear frequency relationship as respects shaft rotation is obtained by the use of two ganged linear potentiometers and since these components may be obtained commercially with an accuracy in linear relation between resistance and shaft position exceeding 0.1 per cent, the linear accuracy of the oscillator may be made comparable thereto. Indeed tests indicate that more often than not what small errors are present in the potentiometers compensate for each other so that in actual operation the oscillator of this invention has an accuracy which exceeds the rated accuracy of any single potentiometer.

Since the invention utilizes inductances, these components necessarily have a certain resistance and distributed capacity which affects the linearity of operation of the oscillator at the upper and lower ends of its range of operation. The resistance of the inductances affect linearity at the lower end and the distributed capacity affects the linearity at the upper end. While the linearity of operation in the central portion of the range is good such range of operation is necessarily restricted and it is a purpose of the present invention to extend this range by the introduction of certain corrective factors.

To this end this invention contemplates the use of a network which acts to shift the phase of the system so that errors in the low frequency range are corrected and additionally the bridge circuit is provided with a corrective capacity acting to correct errors in true linearity at the high frequency end of the range. By using such corrective means an oscillator may be obtained which has a linearity of better than 0.1 per cent over a frequency range greater than 10 to 1.

The exact nature of the invention will be more readily understood from a consideration of the following detailed description when considered together with the attached drawings, in which.

Figure 1:
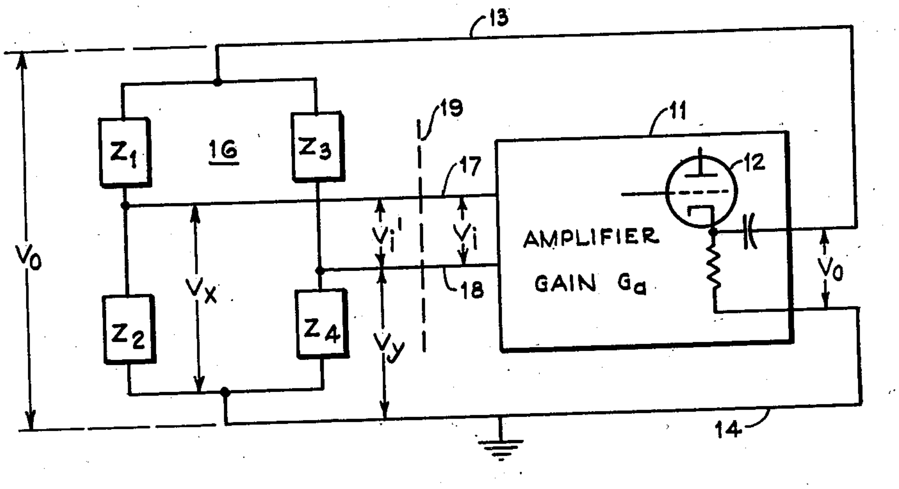
Figure 1 is a simplified schematic diagram illustrating the voltage relationships and some of the principles of operation of the system.

Before discussing the detailed circuits of the oscillator of the invention, the general principles of the operation thereof and the conditions required to maintain oscillation will be described in connection with the simplified circuit of Fig. 1.

Referring to this figure the rectangle 11 generally represents an amplifier which is provided with a cathode follower output 12. The use of a cathode follower is not absolutely essential but aids in the performance in driving the bridge circuit when the impedance of the bridge is low at low frequencies and also decreases phase shift at the high frequencies which would otherwise be introduced by the stray capacitance load on the relatively high impedance plate circuit of the output stage of a resistance capacity coupled amplifier. The output of this amplifier is connected through conductors 13 and 14 to the input terminals of a bridge network 16 consisting of impedances $Z_1$, $Z_2$, $Z_3$ and $Z_4$ each of which constitutes one arm of a four arm bridge. The output terminals of the bridge 16 are in turn connected to the input terminals of the amplifier 11 through the medium of conductors 17 and 18 so that the bridge network 16 and the amplifier 11 constitute a closed loop.

Consider for the moment that the conductors 17 and 18 are broken at the points indicated by the dotted line 19. A voltage $V_1$ is impressed on the input of the amplifier which is amplified by the gain $G_a$ thereof to a voltage $V_o$, the output voltage of the amplifier. The output voltage $V_o$ is impressed on the input of the bridge circuit 16 through the conductors 13 and 14 where it is attenuated by the action of the bridge circuit to a voltage $V_1'$. If now the circuit is completed through the conductors 17 and 18, that is, circuit is made at the points indicated by the dotted line 19 equilibrium will be established in accordance with the principle of unity loop gain when the voltage $V_1'$ equals the voltage $V_1$ in both amplitude and phase. In other words, the attenuation of the bridge circuit must equal the gain of the amplifier and the phase shift caused by the bridge circuit must be equal and opposite to the phase shift of the amplifier. To establish this equilibrium the frequency and amplitude of oscillations produced by the circuit automatically adjust themselves until the absolute value of the voltage $V_1'$ equals that of $V_1$ and their phases are equal.

Figure 2:
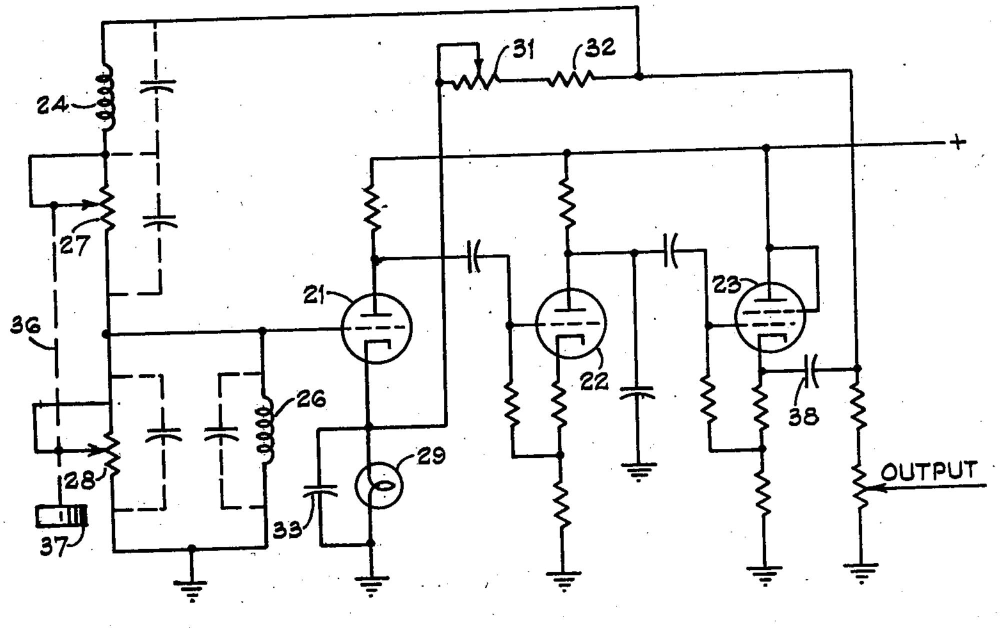
Figure 2 is a schematic diagram of a preferred circuit utilizing the principles of the invention.

Turning now to the more detailed circuit of Fig. 2 the amplifier depicted in Fig. 1 as the rectangle 11 is here disclosed as comprising resistance-capacitance coupled amplifier stages 21 and 22, the latter of which is resistance-capacitance coupled to a cathode follower output stage 23. The bridge circuit 16 is composed of inductances 24 and 26, potentiometers 27 and 28, resistors 31 and 32 and a resistance whose resistance increases with increase in current such as an incandescent lamp 29. The inductance 24 in series with the potentiometer 27 constitutes the impedance $Z_1$ (Fig. 1) while the inductance 26 in parallel with the potentiometer 28 constitutes the impedance $Z_2$ (Fig. 1). Similarly the resistors 31 and 32 constitute the impedance arm $Z_3$ and the incandescent lamp 29 the impedance arm $Z_4$. This latter element is shunted by a condenser 33 for purposes as will be more fully described hereinafter. For the present the arm $Z_4$ will be considered as composed only of the incandescent lamp 29.

Consider first the manner in which amplitude equilibrium is attained and maintained which is the function of the branch $Z_3$ and $Z_4$ (Fig. 1) i. e., the resistors 31, 32 and incandescent lamp 29 of Fig. 2.

The attenuation in the bridge circuit that is the amount by which the bridge circuit decreases the signal amplitude impressed thereon is the ratio of the output voltage to the input voltage of the amplifier, namely $$\frac{V_o}{V_i}$$

and by reference to Fig. 1 it will be apparent that $$V_i = V_x - V_y \qquad (1)$$

so that the attenuation may be expressed by the formula $$\frac{V_o}{V_x} - \frac{V_o}{V_y} \qquad (2)$$

the voltage $V_y$ being the drop across the incandescent lamp 29.

If the loop gain is greater than unity, that is, the attenuation of the bridge circuit is not equal to the gain of the amplifier the amplitude of oscillations increases and the voltage across the lamp 29 increases. This increase in voltage across the lamp heats the filament thereof, thereby increasing its resistance. As the resistance increases the fraction $$\frac{V_o}{V_y}$$

decreases and the attenuation of the bridge circuit given by Equation 2 increases thus bringing the loop gain back to unity. Contrariwise, if the loop gain has a tendency to decrease below unity a reverse action takes place and thus there is an automatic readjustment of the absolute gain to unity, regardless of a tendency of one of the sections to change in gain, as for example, a change in gain in the amplifier section due to aging of the tubes or fluctuations in the power supply voltage. The $Z_3$, $Z_4$ branch of the bridge circuit, therefore, acts as the means to control the amplitude of oscillation.

In place of the use of a resistor whose resistance increases with increase in current as exemplified by the lamp 29, the same game control function can also be attained by the use of a resistor in the $Z_3$ branch whose resistance decreases with increase in current as a thermistor or the like as will be readily appreciated by those skilled in the art.

The $Z_1$, $Z_2$ branch has as its function the control of the frequency of oscillations. The voltage $V_x$ (see Fig. 1) is the voltage drop produced across the $Z_2$ arm and the phase of this voltage changes with frequency. The locus of this voltage is illustrated as a circle in the vector diagram of Fig. 3. In this figure the resonant frequency of the bridge circuit (not necessarily the frequency of oscillation) is defined as the frequency at which the voltage $V_x$ has the same phase as the output voltage $V_o$. When the frequency of the signal applied to the bridge circuit is above the resonant frequency thereof this voltage lags the output voltage $V_o$ as represented by the vector $V_x''$ and when the frequency of the signal is below the resonant frequency of the bridge circuit the voltage leads the output voltage as represented by the vector $V_x'$.

Let it be assumed for the present, that the phase shift of the amplifier section is zero so that the voltage input to the amplifier section $V_1$ is given by the vector subtraction of the voltage $V_y$ from $V_x$. The voltage $V_y$ constituting the potential drop across the $Z_4$ arm of the bridge branch $Z_3$, $Z_4$ is always in phase with the output voltage $V_o$ of the amplifier since it is composed of pure resistances 29, 31 and 32 (see Fig. 2). Under the assumption that the amplifier has zero phase shift, the principle of unity loop gain as applied to the amplifier and bridge sections requires that the phase of the amplifier section input voltages $V_1$ relative to the phase of the output voltage $V_o$ must also be zero. Therefore, for equilibrium conditions to prevail the frequency of oscillations must be such that the voltage $V_x$, namely the voltage drop across the $Z_2$ arm of the $Z_1$, $Z_2$ branch of the bridge section, is also in phase with the voltage $V_o$, i. e., the output voltage of the amplifier section which likewise constitutes the input voltage of the bridge section. In this particular case the frequency of oscillation of the entire circuit is the resonant frequency of the bridge circuit and the frequency of oscilaltion is determined by the fact that the branch $Z_1$, $Z_2$ consisting of potentiometers 27 and 28 and inductances 24 and 26 shift phase with the frequency of oscillations impressed thereon. Under the assumptions made thus far, namely, that the frequency of oscillations are the same as the resonant frequency of the $Z_1$, $Z_2$ branch of the bridge section this frequency may be expressed for any values of the inductanes 24 and 26 and resistances of potentiometers 27 and 28 by the formula:

$$F_o = \frac{\sqrt{R_1 R_2}}{2\pi\sqrt{L_1 L_2}} \qquad (3)$$

where $F_o$ is the resonant frequency of the $Z_1$, $Z_2$ branch, $R_1$ is the resistance of potentiometer 27, $R_2$ the resistance of potentiometer 28, $L_1$ the inductance of the inductor 24 and $L_2$ the inductance of inductor 26. The potentiometers 27 and 28 are operated by a single control indicated by the shaft 36 and knob 37 (Fig. 2). If linear potentiometers are used, that is, potentiometers wherein the resistance of each is directly proportional to its shaft position, it is apparent from a consideration of Equation 3 that the frequency of oscillations of the circuit may be made directly and linearly proportional to shaft position which is the desideratum of this invention, the variable elements constituting the numerator of the equation.

In an oscillator of this nature it is most practical to make the inductances equal and the two potentiometers equal although this is not essential as long as the resistance of each potentiometer is directly proportional to its shaft position. In such an instance, i. e., where there is equality of resistance and inductance Equation 3 may be simplified to the expression $$F_o = \frac{R}{2\pi L} \qquad (4)$$

R being the resistance of either one of the potentiometers and L being the inductance of either one of the inductors.

Figure 5:
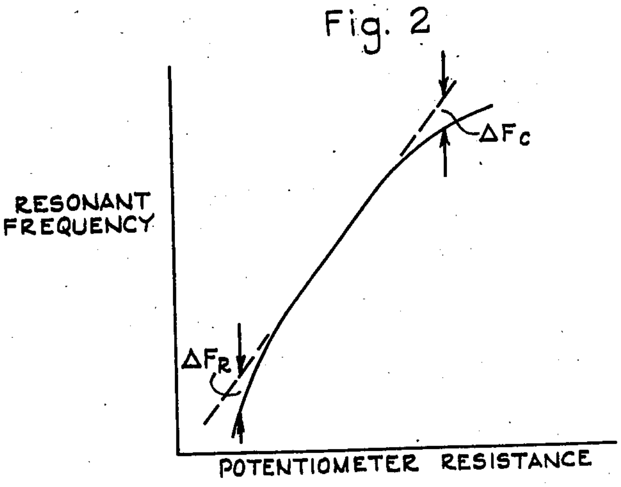
Figure 5 is a curve illustrating the departure from linearity prior to the introduction of the corrective factors of the invention.

So far the relationship of variation of frequency as respects shaft position of the potentiometers has been considered only in the case where the inductors 24 and 26 were theoretically perfect, that is, having no resistance and no distributed capacity. Of course, such is not the case and even though these factors are made as small as possible their presence affects the linear relationship between resonant frequency and shaft position as expressed by Equation 4. Where, as here, accuracies of 0.1 per cent or better are desired the non-linearity introduced by the presence of distributed capacity and the resistance of the inductors limits the range of frequencies that may be obtained both at the high and low ends of the range. The presence of distributed capacity limits the range at the high end while the resistance of the inductors acts to limit the range at the low end. This departure from true linearity is graphically illustrated in Fig. 5, wherein the solid curve indicates the relationship between resonant frequency and potentiometer resistance in the absence of any corrective factors. The departure from linearity due to the wire resistance of the inductors at the low frequency end is indicated by the difference between the solid line curve and dotted straight line, this difference being labeled $\Delta F_R$. Similarly the departure from linearity at the high frequency end due to the distributed capacity is indicated by the difference between the solid line curve and the straight dotted line labeled $\Delta F_C$.

It is one of the purposes of the present invention to provide such instrumentalities as to correct for these indicated departures from linearity and thereby extend the range of frequencies over which the device may operate with the required degree of linearity.

Consider first the inaccuracy introduced by the wire resistance of the inductances, that is, the departure from linearity here denoted as $\Delta F_R$. By calculation of the $Z_1$, $Z_2$ branch it may be determined that the frequency of resonance is not as expressed by Equation 4 above but by the equation:

$$F_o = \frac{[R^2 - R_0^2]^{\frac{1}{2}}}{2\pi L}$$

If $R_0$ is sufficiently small compared to R the frequency is given to a close approximation, by $$F_o = \frac{R}{2\pi L} - \frac{R_0^2}{4\pi RL} \qquad (5)$$

where $F_o$, R, and L have the values as given in connection with equation 4 and $R_0$ is the wire resistance of each of the inductors considering each to be identical in all respects. The term $$\frac{R}{2\pi L}$$

is of course the linear term desired whereas the term $$\frac{R_0^2}{4\pi RL}$$

is the nonlinear term designated $\Delta F_R$ for which correction is desired. Since this term varies as the reciprocal of the resistance R of the potentiometers, it increases as the resistance and hence the frequency decreases, which of course, is the relationship indicated by the graph of Fig. 5.

The corrective factor as far as the low frequency end of the range is concerned, is introduced by shifting the phase of the amplifier section in such a manner as to introduce the required correction. It has heretofore been assumed that no phase shift existed in the amplifier section and when this is so the frequency of oscillation is equal to the resonant frequency of the bridge section. When, however, the phase shift of the amplifier section is not zero, the principle of unity loop gain requires that there shall be a compensating phase shift in the $Z_1$, $Z_2$ branch of the bridge network.

Figure 3:
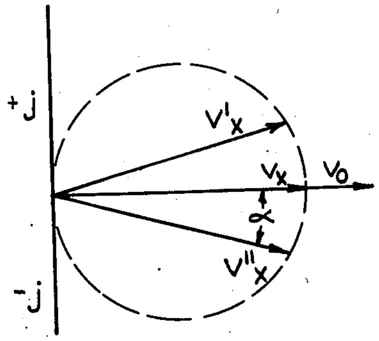
Figures 3 and 6 are illustrations of vector relationships of the voltages of the circuit.

Consider, for example, that the output voltage of the amplifier section $V_o$ leads the input voltage of the amplifier section $V_i$ by an angle due to a phase shift introduced in the amplifier section. The voltage $V_y$ (see Fig. 1) must be in phase with the voltage $V_o$ because the $Z_3$, $Z_4$ branch of the bridge section is composed of pure resistance. The voltage $V_x$ obtained from the drop across the $Z_2$ arms, however, changes in phase with frequency as illustrated in Fig. 3. Two effects, therefore, occur simultaneously, the voltage $V_y$ changes in amplitude by action of the ballast lamp 29 (Fig. 2) until the amplitude of oscillations is stabilized and at the same time the frequency of oscillations produced and impressed on the bridge section increases until the voltage $V_x$ lags by the phase angle $\alpha$ as indicated by the vector $V_x''$ of Fig. 3. When equilibrium conditions are reached the phase of the amplifier input voltage $V_i$ which is the vector difference of the voltages $V_y$ and $V_x$ is the negative of the phase angle of the amplifier section.

Figure 6:
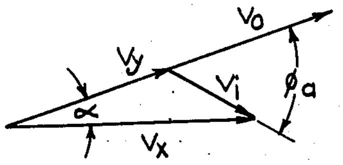

This vector relationship is illustrated in graphic form in Fig. 6 wherein $\theta_a$ is the phase shift of the amplifier section, $V_y$ is in phase with the amplifier output voltage $V_o$ and $V_x$ lags such voltage by the angle $\alpha$ so that the voltage $V_i$ has a phase which is equal to $-\phi_a$.

Because the frequency of oscillations of the circuit increased to a value greater than the resonant frequency of the bridge section, the frequency of oscillations $f$ are no longer equal to the resonant frequency of the bridge circuit $F_o$ but are greater by an increment $\Delta F_o$, that is $$f = F_o + \Delta F_o \qquad (6)$$

The effect of this difference in frequency, i. e., $\Delta F_o$ may be made to increase the linearity of the oscillator insofar as the linearity error $\Delta F_R$ is concerned since as indicated by Equation 5, the non-linear term is a negative quantity.

In the instant invention the proper phase shift in the amplifier section, which in turn increases the frequency of oscillations generated above the resonant frequency of the bridge section and hence corrects for the departure from linearity at the low frequency end of the scale, is produced by the loading of the bridge circuit on the cathode follower output stage. The cathode follower stage 23 is connected to the bridge section through a condenser 38 and by proper selection for the value of this condenser the loading of the bridge circuit may be made such as to produce a phase shift in the amplifier section in the low frequency range such that linearity of frequency with change in potentiometer resistance is attained and the operating range of linearity materially increased for a required degree of accuracy.

Figure 4:
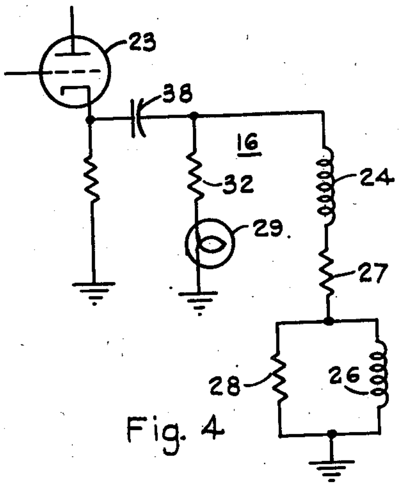
Figure 4 is a schematic diagram of a portion of the circuit of Fig. 2 redrawn to illustrate the manner in which variable phase shift is obtained.

For greater ease in understanding the manner in which this correction is attained, the portion of the circuit including the cathode follower 23 and the bridge section has been redrawn in a somewhat simplified form in Fig. 4, the same reference characters being used as heretofore applied to the complete circuit of Fig. 2.

By a reference to Fig. 4 it will be apparent that the load on the cathode follower 23 consists of the bridge section in series with the condenser 38. By choosing the correct value for the condenser 38, the relative impedances may be made such that the condenser has little or no effect on the phase shift for frequencies above a certain value whereas a progressive correction is introduced in the low frequency range. Considering this low frequency range, for example, as the resistances 27 and 28 are reduced in value by the common potentiometer control, the frequency of the output signal is also reduced in the manner heretofore described. This reduction in frequency of output signal however, increases the impedance of the condenser 38 as respects the impedance of the bridge section so that the phase of the signal impressed across the bridge section is shifted with respect to the phase of the signal impressed on the input of the cathode follower 23. Mathematically the amount of phase shift may be expressed by the equation $$\text{Sin}\ \phi_a=\frac{1}{2\pi fC(R_3+R_4)}+\frac{1}{3\sqrt{2}\pi fCR} \qquad (7)$$

where $\phi_a$ is the phase shift, $f$ the frequency, C the capacity of condenser 38, $R_3$ the resistance of resistor 32, $R_4$ the resistance of the lamp 29 and R the resistance of either one of the potentiometers 27 or 28 if as suggested heretofore, both are identical in construction. The deviation from resonant frequency $\Delta F_0$ as a result of this phase shift is proportional to the resonant frequency $F_0$, the sine of the phase angle $\phi_a$ and inversely proportional to the gain $G_a$ of the amplifier. Where the deviation in frequency is small compared to the resonant frequency this deviation in frequency may be expressed in terms of the values of Equation 7 and the gain of the amplifier section, as follows:

$$\Delta F_a=\frac{9}{4\pi C(R_3+R_4)G_a}+\frac{3}{2\sqrt{2}\pi CRG_a} \qquad (8)$$

Since $R_3$ and $R_4$, C and $G_a$ are substantially constant the first term of the right hand side of Equation 8 is constant while the second term varies as the reciprocal of the resistance R of the potentiometers and therefore constitutes the term which acts to introduce the linear corrective factor.

As indicated in Equation 5 the error $\Delta F_R$ tended to be introduced by the resistance $R_0$ of the inductors is equal to $$-\frac{R_o^2}{4\pi RL}$$

If then this term is equated to the corrective term $$\frac{3}{2\sqrt{2}\pi CRG_a}$$

of Equation 8, the capacitance C of the condenser 38 may be determined for zero error conditions, as $$C=\frac{3\sqrt{2}L}{R_o^2G_a} \qquad (9)$$

The mathematical value for the value for the capacitance of the condenser is based on some approximations. Equation 9, however, indicates the general relationship between capacity and gain of the amplifier that may obtain to produce the results sought, namely, increased linearity between variation of potentiometer resistance and frequency of signal output at the low frequency end of the range.

The error or departure from linearity at the high frequency end of the range $\Delta F_c$ as indicated heretofore is caused by the distributed capacity of the inductors 24 and 26 and the potentiometers 27 and 28. These stray capacities are indicated by the dotted line connections of condensers across these elements in the circuit of Fig. 2. In the series arm of the bridge section, i. e., the $Z_1$ arm these capacities are in series while in the parallel or $Z_2$ arm these capacities are in parallel. The effective capacity across the $Z_1$ arm therefore is less than the effective capacity across the $Z_2$ arm. The relationship of the four arms of the bridge section may be expressed as $$\frac{Z_1}{Z_2}=\frac{Z_3}{Z_4} \qquad (10)$$

To balance out the difference in capacities of the $Z_1$ and $Z_2$ arms, therefore, a capacity 33 is connected in shunt to the $Z_4$ arm, i. e., the lamp 29. Alternatively if desired, an inductance may be connected in parallel with the $Z_3$ arm, that is, the resistors 31 and 32 with a similar effect of reducing the departure from linearity at the high frequency end of the range.

The resistor 31 is made adjustable so that a desired amplitude of output may be obtained with any given lamp 29 which may be used since various lamps of the same type vary considerably in their characteristics.

The present invention then provides an oscillator whose frequency may be varied over a considerable range, say, 10 to 1 with an accuracy which departs from linearity by no more than 0.1 per cent, the accuracy of a good linear potentiometer. In fact it has been found that because the potentiometers are varied together, the total error may be less than the error of either potentiometer because both potentiometers would have to be in error at the same shaft position for the error to equal the error of either potentiometer. Since this condition is unlikely, errors less than the error of either potentiometer are probable. Certainly the error can never be greater than the error existing in one potentiometer and most frequently will be less than the error of either, for example, tests have established errors of as low as .02 per cent although the accuracy of the potentiometers used was only of the order of 0.1 per cent.

What is claimed is:

1. An oscillator comprising a bridge network, a first arm therefor comprising an inductance and a linearly adjustable resistor connected in series, a second arm comprising an inductance and linearly adjustable resistor connected in parallel, said first and second arms being connected together to form one branch of said bridge network, a third arm comprising a resistance and a fourth arm including a member whose resistance varies with variation in current flow therethrough, said third and fourth arm being connected together to form a second branch of said bridge network, said branches being connected together, an amplifier section including a first thermionic tube having at least an anode, cathode and control electrode, a connection between said control electrode and the juncture of said first and second arms, a connection between said cathode and the juncture of said third and fourth arms, an output circuit for said amplifier section and connections between said output circuit and the junctures of said first and second mentioned bridge branches.

2. An oscillator comprising an amplifier section and a four arm bridge section, one arm of said bridge section including an inductance and a potentiometer connected in series, said potentiometer having its movable contact connected to one end thereof the resistance of said potentiometer bearing a substantially linear relation to the position of its movable contact, another arm of said bridge section including an inductance and a potentiometer connected in parallel, said potentiometer having its movable contact connected to one end thereof the resistance of said second mentioned potentiometer bearing a substantially linear relation to the position of its movable contact, said arms being connected to form one branch of said bridge section and said potentiometers having their movable contacts connected for conjoint actuation, a second branch for said bridge section comprising a resistance arm and an arm whose resistance varies with variation of current flow therethrough, said amplifier section including an output stage comprising a thermionic tube having at least an anode, cathode and control grid, an unbypassed resistor connected between said cathode and one end of said bridge section branches, a condenser connected between said cathode and the other end of said bridge section branches and connections between the remaining terminals of said bridge section and the input of said amplifier section to form a closed loop between said sections.

3. An oscillator comprising an amplifier section and a four arm bridge section, the first arm of said bridge section including an inductance and a potentiometer connected in series, said potentiometer having its movable contact connected to one end thereof the resistance of said potentiometer bearing a substantially linear relation to the position of its movable contact, the second bridge arm including an inductance and a potentiometer connected in parallel, said potentiometer having its movable contact connected to one end thereof the resistance of said last mentioned potentiometer bearing a substantially linear relation to the position of its movable contact, said first and second arms being connected together to form one branch of said bridge section and said potentiometers having their movable contacts connected for conjoint actuation, the third arm for said bridge section comprising a resistance and the fourth arm connected thereto to form the second branch of said bridge section comprising an element whose resistance varies with variation in current flow therethrough and a condenser connected in parallel thereto, a circuit connecting the output of said amplifier section and the common junctures of the branches of said bridge section and a circuit connecting the remaining terminals of said bridge section and the input of said amplifier section to form a closed loop between said sections.

4. An oscillator in accordance with claim 3 in which the circuit connecting the output of said amplifier section and the common junctures of the branches of said bridge section includes means for shifting the phase of the signal impressed on said bridge section to compensate for errors in linearity introduced by the inherent resistance of said inductances.

5. An oscillator comprising an amplifier section and a four arm bridge section, the first arm of said bridge section including an inductance and a potentiometer connected in series, said potentiometer having its movable contact connected to one end thereof and the resistance of said potentiometer bearing a substantially linear relation to the position of its movable contact, the second bridge arm including an inductance and a potentiometer connected in parallel, said potentiometer having its movable contact connected to one end thereof and its resistance bearing a substantial linear relation to the position of its movable contact, said first and second arms being connected together to form one branch of said bridge section and said potentiometers having their movable contacts connected for conjoint actuation, the third arm for said bridge section comprising a resistance and the fourth arm connected thereto to form the second branch of said bridge section comprising an element whose resistance varies with variation in current flow therethrough and a condenser connected in parallel thereto, a thermionic tube output stage for said amplifier section having at least an anode, cathode and control electrode, an unbypassed resistance connected between said cathode and one common juncture of said bridge section branches and a condenser connected between said cathode and the other common juncture of said bridge section branches.

6. An oscillator in accordance with claim 5 in which said condenser connected between the cathode and bridge section has a value approximately satisfied by the expression:

$$C=\frac{3\sqrt{2}L}{R_0^2G_a}$$

where L is the inductance of the inductance in one of said bridge arms $R_0$ is the inherent resistance of said inductance and $G_a$ is the gain of said amplifier section.

7. An oscillator comprising a bridge network section and an amplifier section, said bridge network section comprising a first arm including an inductance and a linearly adjustable resistor connected in series, a second arm including an inductance and linearly adjustable resistance connected in parallel, a third arm including a resistance and a fourth arm including a member whose resistance varies with variation in current flow therethrough, said first and second arms being connected together to form one branch of said bridge network and said third and fourth arms being connected together to form the other branch of said bridge network, said branches being connected together, said amplifier section including an amplifier having at least an anode, cathode and control electrode, said control electrode being connected to the juncture of said first and second arms and said cathode being connected to the juncture of said third and fourth arms, an output circuit for said amplifier section, a feedback circuit interconnecting said output circuit and the junctures of said bridge network branches, and means connected in said feedback circuit for shifting the phase of the signal impressed on said bridge section by said amplifier section to compensate for errors in linearity introduced by the inherent resistance of said inductances at the low frequency end of the range of said oscillator.

8. An oscillator comprising a bridge network section and an amplifier section, said bridge network section comprising a first arm including an inductance and a linearly adjustable resistor connected in series, a second arm including an inductance and linearly adjustable resistance connected in parallel, a third arm including a resistance and a fourth arm including a member whose resistance varies with variation in current flow therethrough, said first and second arms being connected together to form one branch of said bridge network and said third and fourth arms being connected together to form the other branch of said bridge network, said branches being connected together, said amplifier section including an amplifier having at least an anode, cathode and control electrode, said control electrode being connected to the juncture of said first and second arms and said cathode being connected to the juncture of said third and fourth arms, an output circuit for said amplifier section, a feedback circuit interconnecting said output circuit and the junctures of said bridge network branches, and reactive means connected across one of the arms of said other branch to compensate for errors in linearity at the high frequency end of the range of said oscillator introduced by the inherent capacity of said inductance and adjustable resistors.

9. An oscillator comprising a bridge network section and an amplifier section, said bridge network section comprising a first arm including an inductance and a linearly adjustable resistor connected in series, a second arm including an inductance and linearly adjustable resistance connected in parallel, a third arm including a resistance and a fourth arm including a member whose resistance varies with variation in current flow therethrough, said first and second arms being connected together to form one branch of said bridge network and said third and fourth arms being connected together to form the other branch of said bridge network, said branches being connected together, said amplifier section including an amplifier having at least an anode, cathode and control electrode, said control electrode being connected to the juncture of said first and second arms and said cathode being connected to the juncture of said third and fourth arms, an output circuit for said amplifier section, a feedback circuit interconnecting said output circuit and the junctures of said bridge network branches, means connected in said feedback circuit for shifting the phase of the signal impressed on said bridge section by said amplifier section to compensate for errors in linearity introduced by the inherent resistance of said inductances, and reactive means connected across one of the arms of said other branch to compensate for errors in linearity introduced by the inherent capacity of said inductance and adjustable resistors.

WAYNE K. HODDER.
GEORGE R. GAMERTSFELDER.
ARVID W. JACOBSON, JR.

REFERENCES CITED

The following references are of record in the file of this patent:

UNITED STATES PATENTS

| Number | Name | Date |
|---|---|---|
| 2,163,403 | Meacham | June 20, 1939 |
| 2,268,872 | Hewlett | Jan. 6, 1942 |
| 2,346,396 | Rider | April 11, 1944 |
| 2,441,567 | Darlington | May 18, 1948 |

FOREIGN PATENTS

| Number | Country | Date |
|---|---|---|
| 497,148 | Great Britain | Dec. 12, 1938 |
| 524,314 | Great Britain | Aug. 2, 1940 |
| 114,183 | Australia | Nov. 4, 1941 |

OTHER REFERENCES

Book entitled "Alternating Current Bridge Methods," 4th ed., by B. Hague, published in 1938, pages 323 and 336. (Copy in Division 48.)